United States Patent Office 3,341,850
Patented Sept. 12, 1967

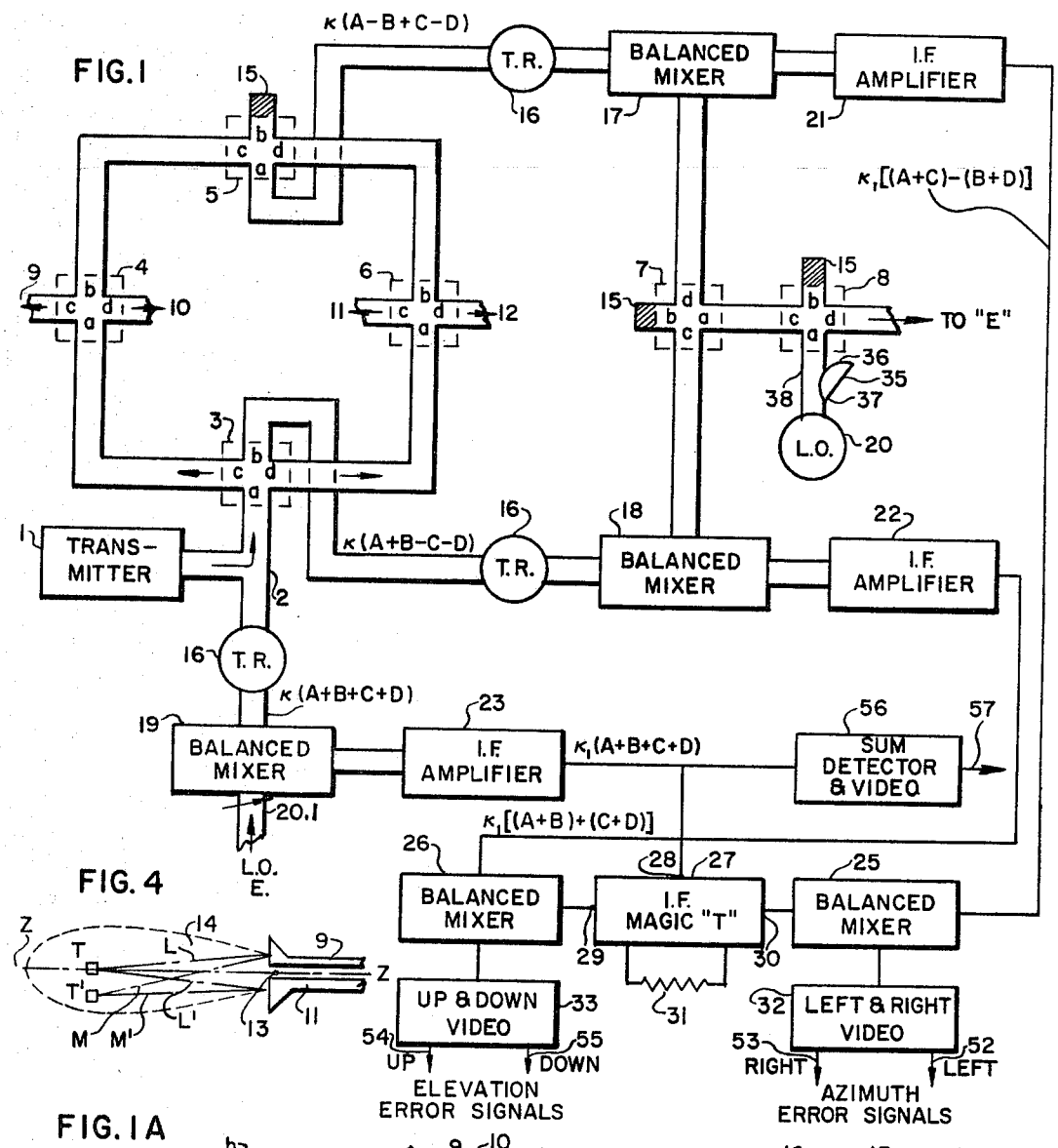

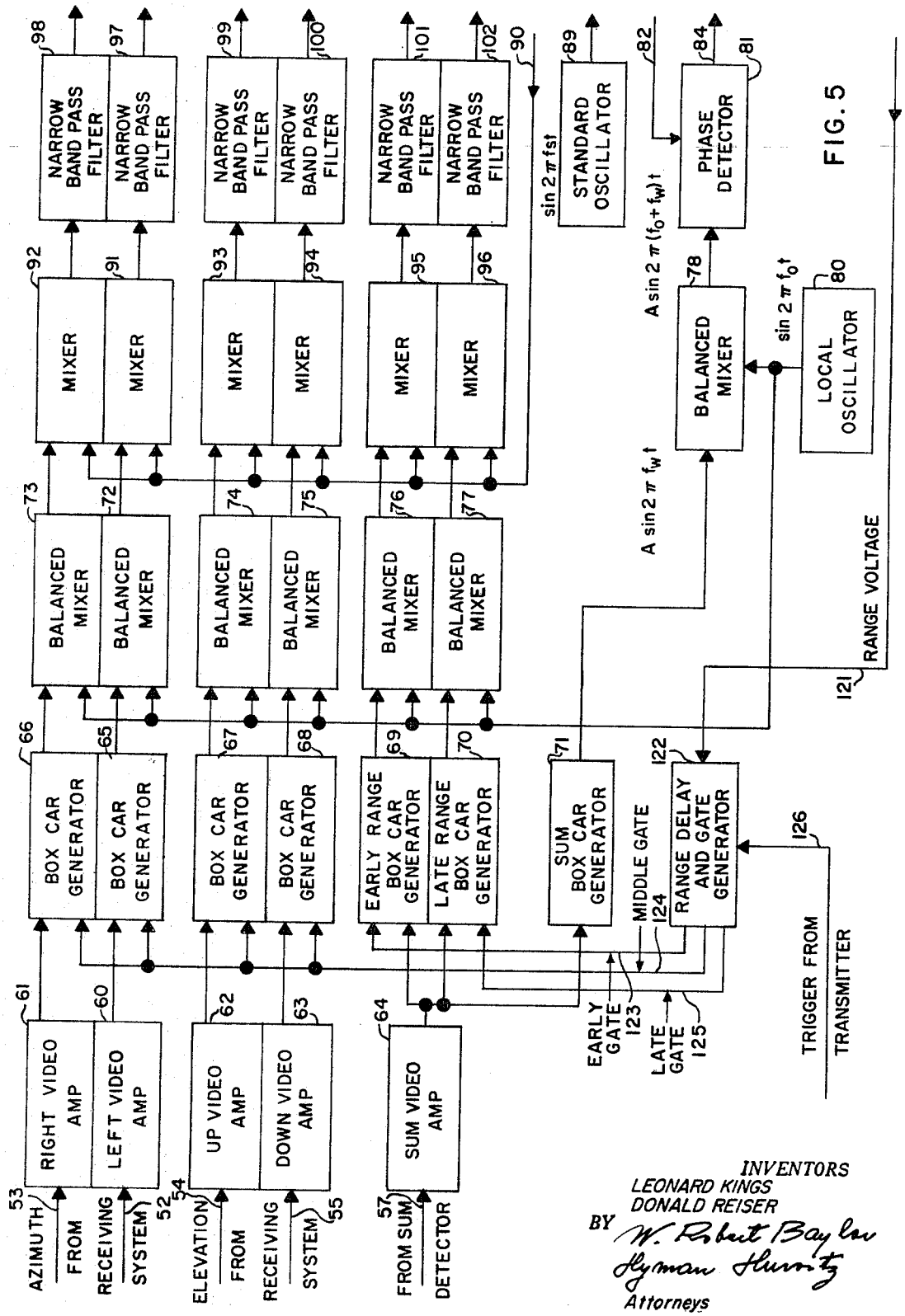

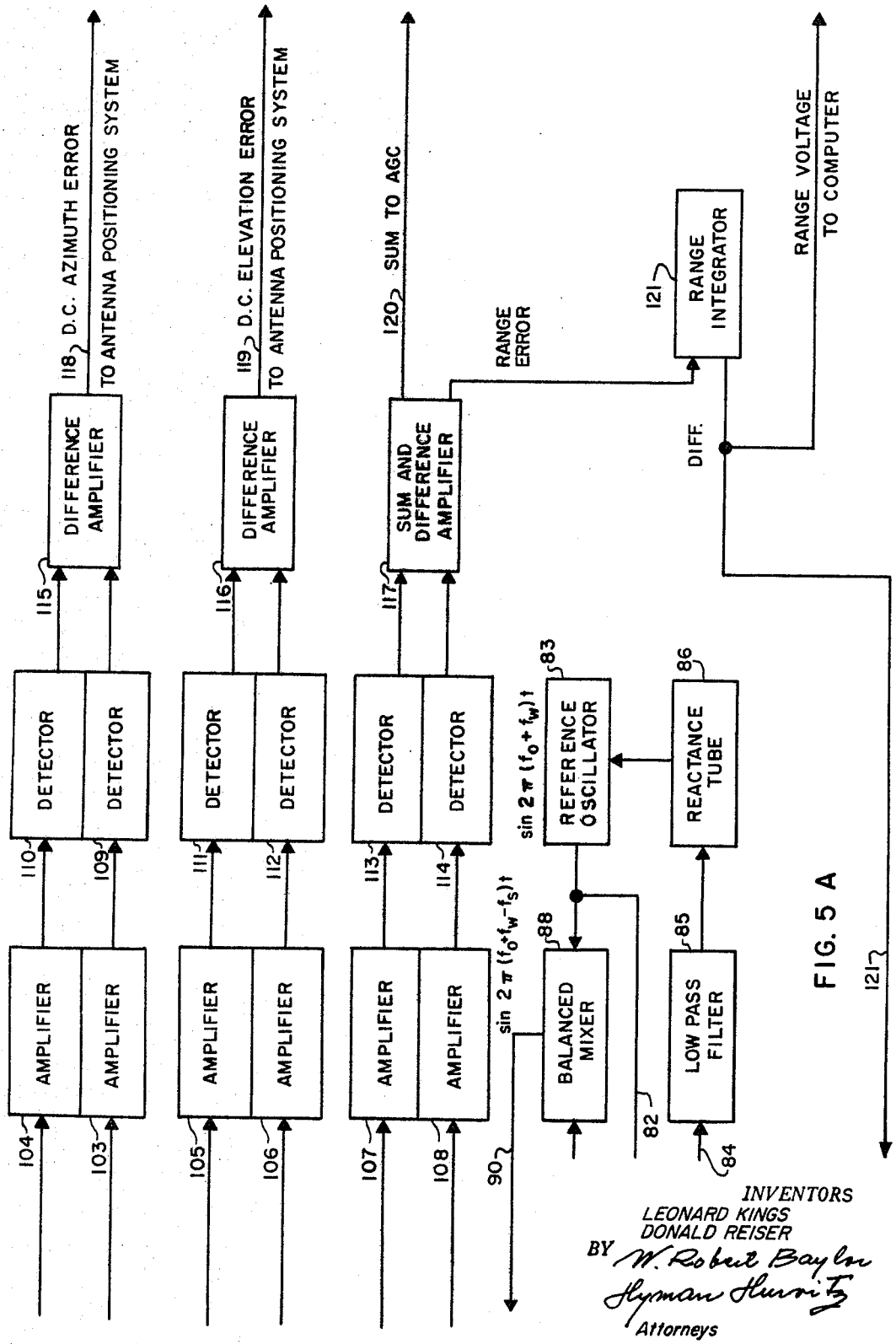

3,341,850
MONOPULSE RADAR SYSTEM FOR TRACKING A COHERENTLY SCINTILLATING TARGET IN THE PRESENCE OF RADAR COUNTERMEASURES
Leonard Kings and Donald Reiser, Alexandria, Va., assignors, by mesne assignments, to Melpar, Inc., Falls Church, Va., a corporation of Delaware
Filed Feb. 19, 1959, Ser. No. 794,445
18 Claims. (Cl. 343—16)

The present invention relates generally to systems for detecting and tracking and predicting the paths of long range missiles, especially when the latter are employed in conjunction with radar countermeasures.

One radar countermeasure which might be employed in conjunction with missiles is "Chaff," and more particularly the countermeasure would consist of causing the missile to disperse chaff after burn-out, and while the missile is still above the earth's atmosphere. Chaff consists of a cloud of radar reflecting material, such as aluminum foil, and it might be expected that this chaff would form a very large reflecting cloud about the missile, that the missile would not necessarily be located centrally of the cloud, and that therefore the presence of the cloud of chaff would prevent precise determination of the location of the missile by radar. Were the cloud of chaff sufficiently extensive, anti-missile missiles fired at the cloud of chaff, and in the absence of precise knowledge of the location of the missile within the cloud of chaff, would have a relatively low probability of hit. It is to be understood that chaff is not an opaque screen for radar signals. Instead, chaff adds incoherent energy return to and about the returned target indicating signal, so that a precise target location determination within the chaff is impossible by conventional radar tracking techniques.

Missiles, while outside the damping effect of the earth's atmosphere, tend to gyrate relative to their centers of gravity, and this gyration occurs at a characteristic rate, and is quite distinct from any gyrations which may occur in a cloud of chaff accompanying the missile, and is far smaller in period.

The main object and feature of the present invention is to detect missiles while the latter are located within a cloud of chaff (or in the presence of other decoys) by tracking the missile in terms of a characteristic modulation generated in returned echo pulses by gyration of the missile. Because chaff is not an opaque screen, it is possible to locate the missile accurately by detecting a characteristic frequency modulation, pertaining to the target and not to the chaff, and which occurs at a time precisely associated with target position, even though the target is within a cloud of chaff.

It may become essential as a practical matter to track a missile when no prior knowledge is available concerning its characteristic frequency or frequencies of gyration.

It is accordingly another object of the present invention to provide a radar system capable of tracking a missile having a rate of gyration which is not precisely known, or which is known only within a large probability of inaccuracy.

It is instructive to consider a numerical example. Consider, for example, a missile located somewhere in a chaff cloud 80 miles wide, 20 miles high, and 20 miles deep. The degree of uncertainty of the re-entry region of the missile is then such that the probable re-entry region would be an ellipsoid approximately 168 miles deep, 60 miles high and 1300 miles wide. If on the other hand, the missile itself could be tracked, the re-entry region would shrink to 0.92 mile deep, 0.28 mile high and 9.4 miles wide. Obviously, in the latter case the probability of destroying the missile by means of a near miss or a hit with an anti-missile missile, on re-entry into the atmosphere, is enormously increased, whereas in the former case the probability of a near miss or a hit is quite small.

As a further consideration, it may be feasible to eject chaff from a missile by means of a subsidiary missile, so that the missile in fact is not within the cloud of chaff. Nevertheless, the cloud of chaff may present a far more attractive target for a tracking radar than does the missile itself. In consequence of this fact anti-missile missiles will be directed toward the chaff by the radar, while the missile itself remains completely untracked, so that probability of intercept is substantially zero.

It is a feature and object of the present invention to provide a radar system which will fail completely to track any target which does not have a wobble frequency, such as may be expected of a true missile.

The above and still further features, objects and advantages of the present invention will become apparent upon consideration of a specific embodiment of the invention, as described in this specification, especially when taken in conjunction with the accompanying drawings, wherein:

FIGURE 1 illustrates in functional block diagram a mono-pulse radar system of a generic type, in conjunction with which the present invention may be employed;

FIGURE 1A illustrates a duplex balancer of a type which may be employed in the system of FIGURE 1;

FIGURE 2 illustrates an arrangement of antenna elements which may be employed in the system of FIGURE 1;

FIGURE 3 is a cross-sectional view taken along the line 3—3 of FIGURE 2;

FIGURES 3A to 3D inclusive, illustrate various conditions of electrical phasing that may exist in the antennas of FIGURE 2, when these antennas are receiving radio signals;

FIGURE 4 illustrates the character of the transmission beam produced by the antenna of FIGURE 2;

FIGURES 5 and 5A ilustrate in block diagram a system according to the present invention, suitable for interconnection with the system of FIGURE 1, and by virtue of which the video pulse product of the system of FIGURE 1 is modified in such fashion that tracking error signals are generated only in the presence of wobble frequency derived from the target being tracked, and not from false targets which fail to generate a wobble frequency.

Referring now more specifically to the accompanying drawings, and more specifically to FIGURE 1 thereof, there of illustrated a radar system of the so-called monopulse type. The radar system includes a radar transmitter 1 connected to a transmission line 2. The energy generated by the transmitter 1 is led through the transmission line 2 to a first junction of four transmission lines *a*, *b*, *c*, *d*, known as a duplex balancer, illustrated schematically in a block 3. Several such balancers i.e., 3, 4, 5, 6, 7 and 8 are employed in the practice of the invention, these balancers being described in U.S. Patent 2,455,895, dated July 27, 1948, entitled, Coupling Arrangements for use in Wave Transmission Systems, and filed in the name of Warren Tyrrell. As disclosed in that patent, the duplex balancer is a system comprising a common junction of four or more transmission lines $a$, $b$, $c$, $d$. If the system is matched to eliminate resonance in the various lines, or the energy being carried therein, the electrical structure and symmetry of the system may be so arranged that the following characteristics are had, among others:

(1) Power fed into line $a$ passes into lines $c$ and $d$ in equal quantities, emerging from $c$ and $d$ in the same phase, no power passing into line $b$.

(2) Power fed into lines $c$ and $d$ in phase enters line $a$, but not line $b$.

(3) Power fed into lines $c$ and $d$ in phase opposition enters line $b$, but not line $a$.

(4) Power fed into line $c$ or $d$ enters lines $a$ and $b$ but not the remaining line $d$ or $c$.

Such a matched arrangement is more specifically termed a "magic tee," and is described in greater detail in a U.S. patent entitled, "Transmission Systems," Ser. No. 581,695, filed Mar. 8, 1945, now Patent No. 2,593,120, dated Apr. 15, 1952, assigned to the United States Government, wherein certain matching means for a magic tee constructed of wave guides are disclosed. The above enumerated characteristics are employed in our present invention as will hereinafter be more fully explained.

Although a duplex balancer may be made of any desired type of transmission line, or of circuit elements, as discussed and shown in the aforementioned patent to Tyrrell, only that form constructed entirely of wave guides, as for example, that illustrated in FIGURE 1A, will be considered herein, inasmuch as the embodiments of our invention herein described illustrate the invention as it may be practiced using wave guides for transmission lines. When any branch $a$, $b$, $c$, or $d$ of any magic tee is not being used, that branch should preferably be terminated in an impedance that will avoid reflections of energy therein, such as the characteristic impedance of the branch. Accordingly in FIGURE 1, the terminations 15 are preferably characteristic impedances for the branches $b$ of the magic tee in which they are installed.

Referring now to FIGURES 1 to 4 inclusive, energy entering the first line $a$ of the first magic tee 3 will in accordance with the above discussion divide and pass into the third and fourth lines $c$ and $d$ of this magic tee in equal quantities and in like phase. No energy will enter the second line $b$. Thereafter the energy in the third line $c$ will proceed into the first line $a$ of the second magic tee 4, and again will divide and leave this second magic tee 4 in equal quantities and like phase through the third and fourth lines $c$ and $d$, respectively thereof. Likewise, the energy from the fourth line $d$ of the first magic tee 3 will enter the first line $a$ of the third magic tee 6 and divide and leave that magic tee through the third and fourth lines $c$ and $d$, respectively, thereof in equal quantities and like phase. From the third and fourth lines, $c$ and $d$, respectively, of the second and third magic tees 4 and 6, respectively, the energy will then pass to four antenna elements 9, 10, 11 and 12 which are thereunto connected by suitable transmission lines.

The antenna elements 9, 10, 11 and 12 are preferably symmetrically arranged around a point 13 and are fed with equal signals of like phase from the second and third magic tees 4 and 6, respectively. As a result, a single lobe 14 of energy is produced by the four antenna elements 9 to 12, inclusive, this lobe having an axis Z—Z passing through the point 13. From one aspect, the four antenna elements 9 to 12, inclusive, comprise two vertically aligned pairs of antennas 9 and 11, and 10 and 12, and from another aspect they comprise two horizontally aligned pairs of antennas 9 and 10, and 11 and 12, respectively. A vertically aligned pair, 9 and 11, is illustrated alone in FIGURE 4 to simplify the discussion. Thus for transmission purposes, the energy generated by the transmitter 1 is emitted by the combined antennas 9 to 12, inclusive, as a single directive beam 14.

For reception purposes, however, it is convenient to think of the energy in each antenna element 9, 10, 11 and 12 as a separate portion of the received energy and to consider the individual phases of these portions. Each antenna element 9, 10, 11 and 12 receives an individual portion A, B, C or D respectively of the energy reflected back into the antenna from a target T that may be in the beam 14. The portions received by the antenna elements each have their individual phases with respect to the others. Thus, for example, when the target T lies on the axis Z—Z, the distances L and L' to each antenna element 9 and 11 respectively are the same, and the portions of energy A and C respectively received in these elements will have the same phase. However, when the target T is at T' the distances M and M' to the antenna elements 9 and 11, respectively, are different, and the portions of energy A and C respectively received in these antennas will have different relative phases which are resolvable into two pairs of components, having respectively like and opposite phases. Similarly, as will be hereinafter explained in greater detail, an off-axis position of the target T in a horizontal plane will result in oppositely phased pairs of components of the energy in other pairs of antennas.

The portions of energy A, B, C and D received by the antenna elements 9, 10, 11 and 12, respectively, are returned to the magic tees 4 and 6, respectively, through the respective third and fourth lines $c$ and $d$ thereof. Considering now the second magic tee 4, for example, the inphase components of the portions A and B of the energy in the third and fourth lines $c$ and $d$ thereof combine in the fashion $A+B$ and enter the first line $a$ thereof, while the oppositely phased components of said portions A and B combine in the fashion $A-B$ and enter the second line $b$ thereof. Likewise, in the third magic tee 6, the inphase components of the portions C and D of energy returned to this magic tee combined in the fashion $C+D$ and enter the first line $a$ thereof, while the oppositely phased components of said portions C and D combined in the fashion $C-D$ and enter the second line $b$ thereof. Thus in the second lines $b$ of the second and third magic tees 4 and 6 respectively, two first parts $A-B$ and $C-D$ of the returned signal will be had, while in the first lines $a$ of these magic tees, two second parts $A+B$ and $C+D$ of the returned signal will be had.

The two first parts $A-B$ and $C-D$ of the returned signal are brought to a fourth magic tee 5 through the third and fourth lines $c$ and $d$ thereof. The inphase components of these two first parts $A-B$ and $C-D$ combine in the first line $a$ of the fourth magic tee 5, and provide a first directional error signal $k(A-B+C-D)$, where $k$ is a constant of proportionality. A matching termination 15 is provided for the second line $b$ of the fourth magic tee 5, for the purpose of absorbing any signal having the value $k(A-B-(C-D))$, the reason for which will be hereinafter explained.

Returning now to the two second parts $A+B$ and $C+D$ of the returned signal present in the first lines $a$ of the second and third magic tees 4 and 6 respectively, these two second parts combine in the first magic tee 3, entering therein through the third and fourth line $c$ and $d$ thereof. The inphase components of these two second parts $A+B$ and $C+D$ combine in the first line $a$ to form a directional reference signal $k(A+B+C+D)$, which is the only signal that is had when the target T lies precisely on the axis Z—Z. The oppositely phased components of these two second parts $A+B$ and $C+D$ combine and enter the second line $b$ of the first magic tee 3 and form a second directional error signal $k(A+B-C-D)$. The first and second directional error signals are in reality azimuth and elevation error signals respectively when the aforementioned pairs of antennas are vertically and horizontally disposed, as will hereinafter become apparent.

The first and second directional error signals and the directional reference signal are each passed through respective receiver protective devices, which may be TR boxes 16, and thence to mixers 17, 18 and 19, respectively, preferably of the balanced mixer type. A common local oscillator 20 is provided for the mixers 17, 18 and 19. The local oscillator output is fed to the first line $a$ of a duplex balancer 8 which is preferably a magic tee. In order that essentially line impedance may be presented to the first arm $a$ of the magic tee 8 from the local oscillator 20 it is desirable to include a matched non-reflective attenuator, as for example the attenuator 35, in the line 38 from the local oscillator to the said first arm $a$. The attenuator 35 has a strip of absorptive material 36 on a curved surface, and is hinged at a point 37 in such a manner as to permit insertion of the material 36 into the line 38 in varying degrees as desired. The attenuator 35 and other similar suitable attenuators are more fully described in U.S. Patent No. 2,646,551 filed in the name of Shepard Roberts. The signal from the local oscillator 20 divides and inphase equal components enter the third and fourth lines $c$ and $d$ of the duplex balancer 8 in like fashion to similar division in the aforementioned first, second and third and fourth duplex balancers 3, 4, 5 and 6 respectively. The local oscillator signal in the third branch $c$ of the duplex balancer 8 enters the first line $a$ of another duplex balancer 7, which again is preferably a magic tee, where further equal division takes place and inphase equal portions of the signal proceed into the third and fourth lines $c$ and $d$ thereof. The signals in these last two mentioned lines $c$ and $d$ are brought into the first and second balanced mixers 17 and 18 as local oscillator signals. Another portion of the local oscillator power, that in the fourth line $d$ of the duplex balancer 8 connected to the local oscillator 20 proceeds to the third balanced mixer 19. If, as preferred, the balanced mixers 7 and 8 are each a magic tee, then the magic tee 8 provides isolation between the magic tee 7 and the mixer 19 thereto connected, and the magic tee 7 provides isolation between the remaining two mixers 17 and 18. This isolation results from the hereinabove mentioned characteristics of a magic tee, which prevent energy entering, for example, the fourth line $d$ of either magic tee 7 or 8 from passing into the third line $c$ thereof thus preventing cross-signals between the first two mixers 17 and 18 or the magic tee 7 and the third mixer 19. Such isolation has the desired result of eliminating a possible source of false error signals. Matching terminations 15 are provided for the second lines $b$ of the two last mentioned duplex balancers 7 and 8, respectively. A line stretcher 20.1 is provided in the line E between the duplex balancer 8 and the third balanced mixer 19 in order that the proper phase may be had between the two directional error signals and the directional reference signal in operations hereinafter occurring.

In order that the apparatus may be better understood, it is appropriate that the nature of a balanced mixer be discussed briefly. The balanced mixer is a device for accomplishing the usual functions of a mixer with the addition of the following desirable characteristics:

(1) That the local oscillator signal alone, even when modulated, does not cause the mixer to produce an output voltage; thus signals such as noise arriving at the mixer with the local oscillator power are not converted.

(2) There must be an input signal to the mixer in addition to local oscillator power before the mixer will produce an output signal.

Patent No. 2,547,378, issued to Robert H. Dicke, discloses balanced mixer circuits having the above characteristics.

The output from each balanced mixer 17, 18 and 19 is fed to an I.F. amplifier 21, 22 and 23, respectively, in conventional superheterodyne receiver fashion. The output of the first I.F. amplifier 21 is $k_1(A-B+C-D)$, where $k_1$ is a second constant of proportionality. This is the I.F. of the first directional error signal, and is fed to a fourth balanced mixer 25 for the purpose of detection. The output $k_1(A+B-C-D)$ of the second I.F. amplifier 22, which is now the intermediate frequency of the second directional error signal, is fed to a fifth balanced mixer 26 for the purposes of detection of that signal. The output $k_1(A+B+C+D)$ of the third I.F. amplifier 23 is used in the fashion of a local oscillator voltage for the two last mentioned balanced mixers 25 and 26, and is fed to an electrical circuit 27 which functions preferably in the manner of a matched duplex balancer or magic tee. Thus the signal from the last mentioned I.F. amplifier 23 enters the circuit 27 at a first point 28 and is evenly divided and proceeds in like phase out of third and fourth points 29 and 30. From these points 29 and 30, the signals are fed to the fourth and fifth balanced mixers 25 and 26 as the local oscillator signals therefor. No power enters the matching impedance 31. This magic tee 27 may be constructed in the fashion of a conventional "hybrid coil" as known in the art of telephony. The textbook, "Communication Enginering," by W. L. Everitt (McGraw-Hill Book Co., second edition, 1937) discusses the hybrid coil at page 318. Again, as in the case of the magic tees 7 and 8, the magic tee 27 provides isolation between the last mentioned balanced mixers 25 and 26. Thus, if, for example, the fourth balanced mixer 25 is not perfectly balanced and feeds some stray signal back into the magic tee 27 through its fourth terminal point 30, this signal will be split between the first and second terminal points 28 and 31. Then, because these terminals are further terminated by their characteristic impedances (the third amplifier 23 and the matched impedance 31 being thereto respectively matched to avoid the reflection of energy), this signal is completely absorbed and none is transferred to the third terminal point 29 or the fifth balanced mixer 26.

The directional reference signal $k_1(A+B+C+D)$ from the third I.F. amplifier 23 and the two error signals $k_1(A-B+C-D)$ and $k_1(A+B-C-D)$ from the first and second I.F. amplifiers 21 and 22, respectively, are all of the same frequency, so that the outputs of the last mentioned balanced mixers 25 and 26 will have but one component each, namely, a modulated direct current or video pulse. These D.C. signals will each be proportional in magnitude to the respective associated directional error signal, and will be zero when that signal is zero. The video outputs are fed to video amplifiers 32 and 33, respectively, which amplify these video signals and provide first and second directional error signals, respectively, which may be used for visual indication or automatic control devices in manners known to the art.

The operation of the apparatus hereinabove discussed will now be explained in greater detail. Referring to FIGURE 4 it will be recalled that when the target T' is off the axis Z—Z the distance from the target M and M' will be greater for one antenna element 9 than for another 11 in the same plane. This will be true for any pair of antenna elements lying in a plane in which the target is off axis. Thus the portions A and C of the energy reflected to the antenna elements 9 and 11, for example, will have components having like and different phases upon entering these two antenna elements. As illustrated in FIGURES 3A to 3D inclusive, various phase configurations of the reflected energy in the antennas 9 to 12 inclusive may be had for various positions of the target T with respect to the axis Z—Z of the beam 14. Thus, in FIGURE 3A, the on-target condition (i.e., target on the axis Z—Z) is illustrated, all components of the portions A, B, C and D of reflected energy being in phase, as shown by the arrows 40 in all four antennas 9, 10, 11 and 12. In FIGURE 3B, the arrows 40 and 41 illustrate the phase configuration of components of the incoming signals A, B, C and D which is had when there is azimuth error in the target position or in the training of the antenna. This configuration may be represented as $(A+C)-(B+D)$, which is algebraically identical to $A-B+C-D$, and yields the first error signal $k(A-B+C-D)$. In FIGURE 3C elevation error is illustrated, as the arrows 40 and 41 show that the top pair 9 and 10 of the antenna elements have components of the portions $A+B$ in one phase while the bottom pair 11 and 12 of the antennas have components of the portions $C+D$ of reflected energy in the opposite phase. This may be represented as $(A+B)-(C+D)$, which is algebraically identical to $(A+B-C-D)$ and yields the second error signal $k(A+B-C-D)$. The condition illustrated in FIGURE 3D is the condition for an undesired mode of oscillation in the antenna elements 9 to 12 inclusive. This is a mode combining received signals in the fashion $(A-C)-(B-D)$, which is had by taking the components in phase opposition of the signals $(A-C)$ and $(B-D)$ in the third and fourth lines $c$ and $d$ of the fourth magic tee 5. This undesired signal normally enters the second line $b$ of the fourth magic tee 5, and is absorbed by the matching termination 15 of that line. The configurations illustrated in FIGURES 3A, 3B, 3C provide the directional reference signal, the azimuth or first error signal and the elevation or second error signal, respectively. As can be readily appreciated, no moving mechanical parts are required to produce these signals.

Connected to the output of the left and right video amplifier 32 are two output leads 52 and 53 on which appear respectively, left and right error signals, i.e., error signals which respectively indicate the extent of error in the pointing of the radar antenna system to the left and to the right. Similarly, the output of the up and down video amplifier system 33 is connected to output leads of which lead 54 provides an up signal and lead 55 provides a down signal. Further, connected to the output of the I.F. amplifier 23, which represents the sum of the energies received by all four antenna sections 9, 10, 11 and 12, is a detector and video amplifier 56 having an output lead 57.

The system as described to this point, by reference to FIGURES 1 to 4 of the accompanying drawings, represents a conventional uni-pulse radar system, as described in U.S. Patent 2,830,288 issued to Robert H. Dicke and bearing a date of Apr. 8, 1958. The present invention represents a system connectable to the leads 52, 53, 54, 55 and 57, respectively, which enable detection of wobble frequency components in the video pulses provided on these leads, and generate error signals only in response to echo pulses which contain the required wobble.

The left and right video pulses appearing on the leads 52, 53, the up and down video pulses appearing on the leads 54, 55 and the sum video pulse appearing on the lead 57, are further amplified in video amplifiers respectively identified by the reference numerals 60, 61, 62, 63 and 64. The outputs of the video amplifiers 60-64 inclusive are applied, respectively, to box car generators 65, 66, 67 and 68. The output of the sum video amplifier 64 is applied to two box car generators 69 and 70 in parallel, of which 69 is an early range box car generator and 70 is a late range box car generator. The latter are gated in accordance with range of a selected target for tracking purposes in a manner which is per se conventional. The output of the sum video amplifier 64 is further provided to an ungated sum box car generator 71.

The box car generators 65 to 71 are essentially pulse lengtheners, i.e., each of these elements, in response to a short video pulse deriving from a target, generates a long video pulse, the length being equal to the time between successive pulses. Accordingly, the outputs of the box car generators 65 to 71 represent video signals of varying amplitudes and in general amplitudes of successive elements of the box car series may change amplitudes by relatively small increments. If desired the box car generator outputs may be smoothed to avoid rapid transitions in amplitude from pulse to pulse.

The outputs of box car generators 65-71, inclusive, are applied respectively to the inputs of balanced mixers 72-78, inclusive, there being further applied to the input circuits of the balanced mixers 72-78, inclusive, the output of a local oscillator 80 which provides a fixed frequency $f_o$ of sinusoidal form and constant amplitude.

If we now assume that the incoming video pulses contain a wobble frequency component $f_w$, in the sense that successive pulses vary in amplitude in accordance with a sine law, because successive ones of the pulses are being reflected from a target having slowly varying attitude and consequently a slowly varying area of reflecting surface, then the outputs of the balanced mixers 72-78 inclusive will all contain frequency component $f_o+f_w$, but will only contain the latter frequency if there is present a frequency component $f_w$. In the absence of the latter component there will be no output from the balanced mixers, since balanced mixers provide at their outputs only sum and difference frequencies and balance out all original input frequencies. Having regard to the amplitudes of the outputs of the balanced mixers 72-78, the balanced mixer 78, since it derives its input ultimately from the sum video amplifier 64, i.e., from the entire returned echo, will have an amplitude proportional to the entire returned echo. On the other hand the balanced mixers 72, 73, 74, 75, 76 and 77 will have signals at their outputs representative of error signals in azimuth, elevation and range respectively, so that one of the mixers 72, 73 in general will have an output signal greater in magnitude than the other, the difference being representative of the error magnitude in one sense in azimuth, while one of the balanced mixers 74, 75 will have an output signal greater in magnitude than the other, the difference being representative of the error signal in one sense in elevation. Similarly one of the balanced mixers 76, 77 will have an output signal greater in magnitude than the other, the difference being representative of the error signal in one sense in range.

The output of the balanced mixer 78 is applied to a phase detector 81, to which, via lead 82 is also applied the output of a reference oscillator 83 of controllable frequency. The output of the phase detector at lead 84 is applied via a low pass filter 85 to the reactance tube 86, which is coupled in frequency control-relation to the reference ocsillator 83. The phase detector provides a control signal so long as the output of the reference oscillator 83 does not equal in frequency and phase the output of the balanced mixer 78, and this error signal, acting through the reactance tube 86 serves to lock the reference oscillator 83 in both frequency and phase to the output of the balanced mixer 78. The output of the reference oscillator accordingly equals $f_o+f_w$ in frequency, but its amplitude is steady and unrelated to the amplitude of the incoming video pulses.

The output of reference oscillator 83 at frequency $f_o+f_w$ is applied to a balanced mixer 88, together with the output of a standard oscillator 89. The latter oscillator has a fixed frequency $f_s$, and the balanced mixer is arranged to provide a difference frequency at fixed amplitude on its output lead 90, i.e., the frequency $f_o+f_w-f_s$. The latter signal is applied to the inputs of mixers 91, 92, 93, 94, 95 and 96, together with the outputs of the balanced mixers 72-77, inclusive, on a one for one basis. Since the outputs of the latter balanced mixers represent frequency $f_o+f_w$, by arranging the mixers 91-96, inclusive, to subtract, outputs of the mixers 91-96, inclusive, will represent frequency $f_s$, and it is important to notice that the frequency $f_s$ will be the output regardless of the precise value of the frequency $f_w$, i.e., the wobble frequency of the missile being tracked. Nevertheless the amplitude of the output signals deriving from the mixers 91-96, inclusive, will represent the error signals as they appeared on the leads 52-57, inclusive, since the outputs of mixers, whether balanced or unbalanced, are proportional to the products of the inputs in respect to amplitudes, and one of the inputs is of fixed amplitude while the other is of amplitude representative of received echo amplitude.

The outputs of the mixers 91-96, inclusive, are connected in cascade, respectively, with narrow band pass filters which pass essentially only the frequency $f_s$, these filters bearing the reference numerals 97-102, respectively. The outputs of filters 97-102, respectively, are amplified in individual amplifiers 103-108, inclusive, which are cascaded one for one with the narrow band pass filters, and the outputs of the amplifiers are detected to provide video pulses in detectors 109-114, respectively.

The outputs of the detectors 109, 110 are compared in a difference amplifier 115. The outputs of the detectors 111, 112 are compared in the difference amplifier 116, and the outputs of the detectors 113 and 114 are compared in a sum and difference amplifier 117. Accordingly, at the output of lead 118 of the difference amplifier 115 appears a D.C. azimuth error signal of proper algebraic sign and magnitude, which may be transmitted to a mechanical device employed for positioning the antenna system of FIGURE 2, in accordance with well known practice. Similarly, at the output of difference amplifier 116, and specifically on lead 119, appears a D.C. elevation error signal, which may likewise be transmitted to the mechanical system which controls the elevational position of the antennas of FIGURE 2. The sum output of the difference amplifier 117 may be applied to an AGC lead 120, for utilization as an AGC signal in the amplifiers of FIGURE 1, and more specifically amplifiers 23, 26 and 25, this being, however, an optional feature. The difference signal, representing an error signal, as it is derived from the sum and difference amplifier 117, is applied to a range integrator 121, which integrates this output and supplies same as a range control voltage via lead 121 to a range delay and gate generator 122. There are three outputs of the range delay and gate generator 122, which appear respectively on leads 123, 124 and 125, at different delay times respectively. These represent early gate, middle gate and late gate signals, of which the middle gate signal is applied to the box car generators 65, 66, 67 and 68, to gate the latter only in response to a desired signal or to an echo at a desired range, while the early gate and late gate signals appearing on leads 120 and 125 are applied to the early range box car generator 69 and the late range box car generator 70 to enable reception only of video signals representing that same target. The range delay and gate generator 122 may be triggered on by means of signal applied on a lead 126, that same signal being also used to trigger the transmitter of the system, whereby range delays are synchronized with transmitted pulses.

*Operation*

Briefly describing the operation of the present system, the radar system of FIGURE 1 is employed as a tracking radar, for tracking a missile having a wobble of frequency $f_w$ due to its gyrations while outside earth's atmosphere. The missile is assumed to be within or adjacent to a cloud of chaff, the latter being dimensionally far more extensive than the missile itself and having either no periodic gyration or an extremely slow periodic gyration, so that only its translatory motion need be considered.

The radar system of FIGURE 1 delivers azimuthal and elevational error signals, on leads 53 and 54, respectively, and also delivers range information on lead 57. The latter information is in the form of video pulses, timed as a function of range, while the error signals have algebraic sign or phase and amplitude representative of sense and extent of error. These signals are supplied to the processing system of FIGURES 5 and 5A, wherein the video pulses are converted to box car pulses by box car generators 65-71. The pulses, provided by box car generator 71, representing total returned echo, are utilized to generate a fixed amplitude sinusoidal wave of frequency $f_o+f_w-f_s$ where $f_w$ is a wobble frequency due to missile gyrations, and $f_o$ and $f_s$ are fixed frequencies. The signal of frequency $f_o+f_w-f_s$ is combined with the error and range pulses, previously converted in frequency to a value $f_o+f_w$, whereby the conversion products are at frequency $f_s$, regardless of the value of $f_w$, and are of amplitudes representative of error signals delivered by the system of FIGURE 1, and of total video energy deriving from the missile, to the exclusion of the chaff.

The signals at frequency $f_s$ are then utilized as range and error signals, to control a range predictor computer, and to control tracking of the radar antenna, all in a manner which is per se conventional.

While we have described and illustrated one specific embodiment of my invention, it will be clear that variations of the general arrangement and of the details of construction which are specifically illustrated and described may be resorted to without departing from the true spirit and scope of the invention as defined in the appended claims.

What we claim is:

1. A radar system comprising means for transmitting radiant energy pulses to a target, directive means for receiving echo pulses from said target, said echo pulses deriving by reflection from said target, said target having a periodically varying reflective area for said radiant energy pulses such that said radiant energy pulses include a component of modulation at frequency $f_w$, where $1/f_w$ is the periodicity of variation of said reflective area, means for deriving a frequency $f_s$ and $f_w$ in response only to said component of modulation at frequency $f_w$, where $f_s$ is a constant frequency, means for deriving said frequency $f_s$ in response only to said frequency $f_s$ and $f_w$, and means responsive to said frequency $f_s$ for directing said directive means toward said target.

2. A radar system for tracking a true radar target in the presence of a false radar target, wherein said true radar target has a periodically variable target area and said false radar target lacks said periodically variable target area, means for receiving echo signals periodically varying in amplitude at a frequency $f_w$ related to the period of said periodically variable target area, means for deriving from said echo signals a response signal at said frequency $f_w$, and means responsive to said response signal for generating a steady signal of fixed frequency $f_s$ having an amplitude which is a function of the amplitude variations of said response signal only, said last means being operative for a relatively wide range of values of periodicity of said periodically variable target area.

3. A radar system for tracking a true radar target of small dimension and of variable target area, wherein said variations of target area may have a wide range of periodicities and wherein said true radar target is immersed in a cloud of reflecting objects dispersed over a volume far more extensive than the volume of said true target, comprising means for receiving echo pulses in superposition from said true radar target and from said cloud of reflecting objects, said echo pulses from said true radar target varying in amplitude as a function of said target area at a frequency $f_w$, means for deriving from said echo pulses a response signal containing $f_w$ at the amplitude of said echo pulses, and means for deriving a signal of constant frequency at frequency $f_s$ and of amplitude representative only of the amplitude of said response signals in response to said response signals.

4. A radar system for tracking a missile located above earth's atmosphere, said missile being located adjacent to an extensive cloud of small reflecting objects, comprising a radar transmitter for transmitting radar pulses toward said missile and said cloud of small reflecting objects, means for receiving an echo pulse in response to each transmitted pulse, and means for abstracting from said echo pulses signals of a single frequency in response only to a component of said echo pulses which is due to wobble of said missile for a wide range of wobble periodicities, said last means comprising a fixed frequency amplitude oscillator, said fixed frequency being said single frequency.

5. A tracking pulse radar system for tracking a wobbling missile located in a cloud of reflecting objects, said system having four radiant energy antennas, all arranged to direct said radiant energy in essentially a single direction, means for applying radio frequency pulses to said antennas co-phasally for radiation toward said missile and said cloud of reflecting objects, and means for controlling said antennas to track said missile in elevation, azimuth and range, to the exclusion of said cloud of reflecting objects, said last means including means for deriving elevation error signal and azimuth error signal of fixed frequency $f_s$ pertaining only to said wobbling missile from echo signals deriving from said missile and said cloud of reflecting objects, said last means including means responsive to said radio frequency pulses for deriving a variable frequency signal of frequency $f_w$ where $f_w$ is the wobble frequency of said missile, and means for converting the frequency $f_w$ to said fixed frequency $f_s$ for all values of $f_w$.

6. In a tracking system, a source of error signal in the form of video pulses having amplitudes representative of said error and amplitude variations having a frequency $f_w$ representative of one of two conflicting targets, means for lengthening said video pulses to have durations equal to the time between adjacent ones of said pulses, a balanced mixer having input circuits and an output circuit, a source of fixed local oscillator frequency $f_o$, means for applying said frequency $f_o$ and the lengthening video pulses to said input circuits, means for deriving from said output circuit a signal having a frequency component $f_o$ plus $f_w$, means for generating a further local oscillator frequency $f_o+f_w-f_s$ of fixed amplitude regardless of the amplitude $f_w$, means for subtractively frequency converting said frequency $f_o+f_wf-_s$ with said signal having a frequency component $f_o+f_w$ to derive another signal of frequency $f_s$, where $f_s$ is invariant in frequency and has an amplitude which is a direct function of the amplitude of $f_w$.

7. In a radar tracking system, a source of first video pulses representative of total energy received by a radar receiving antenna and of second pulses having amplitudes representative of tracking error of said radar receiving antenna, said first and second pulses both including amplitude variations of frequency $f_w$ responsive to periodic attitude variations of a missile and a relatively constant amplitude component responsive to a false target of far greater spatial extent than said missile and traveling with said missile at least adjacent thereto, a source of oscillations of frequency $f_o$, means responsive to said first pulse and to said source of first oscillations of frequency $f_o$ to generate a signal having a frequency component $f_o+f_w$ having an amplitude which is a direct function of the amplitude of $f_w$, a source of oscillations of frequency $f_s$, a source of constant amplitude oscillations of frequency $f_o+f_w$, means responsive to said last two mentioned sources of oscillations for generating a signal of frequency $f_o+f_w-f_s$ and of constant amplitude, means responsive to said second pulses and to said oscillations of frequency $f_s$ for deriving an error signal of frequency $f_o+f_w$, means responsive to said last mentioned error signal and to said signal of frequency $f_o+f_w-f_s$ for generating another error signal of frequency $f_s$, regardless of the value of $f_w$.

8. In a radar system, means including an antenna system for deriving from received radar echo pulses first pulses representative in amplitude of total energy reflected from a periodically wobbling missile and a cloud of chaff and second pulses representative in amplitude and algebraic sign of tracking error of said antenna system, said missile wobbling at a variable frequency $f_w$, means responsive to said first and second pulses for generating continuous fixed frequency signals at frequency $f_s$ representative of tracking error of said antenna with respect to said missile to the exclusion of said cloud of chaff, said last means including devices continuously responsive to the wobble frequency of said wobbling missile for a wide spectrum of wobbling frequencies.

9. A radar system comprising means for transmitting radiant energy pulses to a target, directive means for receiving echo pulses from said target, said target being a periodically varying reflective area for said radiant energy pulses such that said radiant energy echo pulses include a variable amplitude component and also modulation at a variable frequency $f_w$, where $f_w$ is the periodicity of variation of said reflective area, means for deriving from said echo pulses a signal of frequency $f_w$ and having said variable amplitude, a fixed frequency fixed amplitude oscillator for generating a signal of frequency $f_s$, and means responsive to said signal of frequency $f_s$ and said signal of frequency $f_w$ for generating a further signal of fixed frequency $f_s$ having said variable amplitude.

10. The combination according to claim 9 wherein said signal of fixed frequency $f_s$ having said variable amplitude is a directional error signal.

11. The combination according to claim 9 wherein said signal of fixed frequency $f_s$ having said variable amplitude is a range error signal.

12. The combination according to claim 9 wherein said last means includes a fixed frequency oscillator of frequency $f_o$, a balanced mixer responsive to said signal of frequency $f_w$ and to said fixer frequency oscillator of frequency $f_o$ for generating a first heterodyne signal of frequency $f_o+f_w$, a fixed frequency oscillator for generating a signal of frequency $f_s$, means responsive to said heterodyne signal and said signal of frequency $f_s$ for generating a further heterodyne signal of frequency $(f_o+f_w-f_s)$, and means for combining said further heterodyne signal with said first heterodyne signal of frequency $f_o+f_w$ to generate a signal of frequency $f_s$.

13. A monopulse radar system, comprising means for transmitting a radio frequency pulse toward a target, directive means for receiving a responsive pulse from said target, means responsive to said responsive pulse for generating azimuthal error signals, elevational error signals and range error signals pertaining to said target, said error signals each including a periodic modulation component of variable frequency $f_w$ deriving from said target, a source of fixed amplitude signal of frequency $f_s$, means responsive to said signal of frequency $f_s$ and to said error signals for generating fixed frequency azimuthal, elevational and range error signals for all values of $f_w$, and means responsive to said last named error signals for controlling said directive means so as to reduce said error signals.

14. A radar system, comprising means for transmitting at least one radio frequency pulse toward a target, means for receiving at least one responsive pulse from said target, means responsive to said at least one responsive pulse for generating a range error signal pertaining to said target, said error signal including a periodic modulation component of randomly variable frequency $f_w$ deriving from said target, a source of fixed frequency signal of frequency $f_s$, and means responsive to said signal of frequency $f_s$ and said modulation component of randomly variable frequency $f_w$ for generating a fixed frequency range error signal pertaining to said target, regardless of values of $f_w$.

15. A radar system, comprising means for transmitting at least one radio frequency pulse toward a target, means for receiving at least one responsive pulse from said target, means responsive to said at least one responsive pulse for generating signals pertaining to position of said target, said signals including a periodic modulation component of randomly variable frequency $f_w$ deriving from said target, a source of fixed frequency signal of frequency $f_s$, and means responsive to said signal of frequency $f_s$ and to said modulation component of randomly variable frequency $f_w$ for generating fixed frequency signals pertaining to said position of said target.

16. The combination according to claim 15 wherein said fixed frequency signals are error signals pertaining to said target.

17. The combination according to claim 15 wherein said frequency signals are range signals.

18. The combination according to claim 15 wherein said fixed frequency signals are direction indicative signals.

References Cited
UNITED STATES PATENTS
2,830,288   4/1958   Dicke _____ 343—16

RODNEY D. BENNETT, *Primary Examiner.*

FREDERICK M. STRADER, CHESTER L. JUSTUS,
*Examiners.*

G. J. MOSSINGHOFF, D. MEXIC, R. E. KLEIN, J. P. MORRIS, *Assistant Examiners.*